United States Patent
Konishi et al.

(10) Patent No.: US 12,122,389 B2
(45) Date of Patent: Oct. 22, 2024

(54) SURROUNDING VEHICLE MONITORING DEVICE AND SURROUNDING VEHICLE MONITORING METHOD

(71) Applicant: HONDA MOTOR CO., LTD., Tokyo (JP)

(72) Inventors: Tatsuya Konishi, Saitama (JP); Akinori Oi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 245 days.

(21) Appl. No.: 17/514,925

(22) Filed: Oct. 29, 2021

(65) Prior Publication Data
US 2022/0135042 A1     May 5, 2022

(30) Foreign Application Priority Data

Nov. 4, 2020   (JP) .................................. 2020-184140

(51) Int. Cl.
*B60W 40/04*   (2006.01)
(52) U.S. Cl.
CPC ......... *B60W 40/04* (2013.01); *B60W 2552/10* (2020.02); *B60W 2554/4041* (2020.02);
(Continued)

(58) Field of Classification Search
CPC ............. B60W 40/04; B60W 2552/10; B60W 2554/4041; B60W 2554/4042;
(Continued)

(56) References Cited

U.S. PATENT DOCUMENTS 7,266,453 B2 * 9/2007 Sawamoto ............. G08G 1/166
                                                          340/436
9,053,554 B2 * 6/2015 Uchida ..................... G06T 7/20
(Continued)

FOREIGN PATENT DOCUMENTS

CN        107792070 A     3/2018
CN        108263383 A     7/2018
(Continued)

OTHER PUBLICATIONS

"Smeulders, A et al., Visual Tracking: An Experimental Survey, Jul. 2014, IEEE Transactions on Pattern Analysis and Machine Intelligence, vol. 36, No. 7" (Year: 2014).*
(Continued)

*Primary Examiner* — Elaine Gort
*Assistant Examiner* — Christopher R Cardimino
(74) *Attorney, Agent, or Firm* — Armstrong Teasdale LLP

(57) ABSTRACT

A surrounding vehicle monitoring device includes an acquiring unit configured to acquire a midpoint between a rear left end position and a rear right end position of another vehicle, acquire a width of the other vehicle, and change a current position of a great change position to a corrected position and acquire a midpoint between a current position of a small change position and the corrected position as a position of the other vehicle in a case where a changing amount of the width is equal to or more than a first threshold. The great change position is one of the rear left end position and the rear right end position whose changing amount is the greater of the two. The small change position is another of the rear left end position and the rear right end position whose changing amount is the smaller of the two.

5 Claims, 5 Drawing Sheets

(52) U.S. Cl.
CPC .............. *B60W 2554/4042* (2020.02); *B60W 2554/4043* (2020.02); *B60W 2554/4045* (2020.02); *B60W 2554/4046* (2020.02); *B60W 2554/801* (2020.02); *B60W 2554/802* (2020.02); *B60W 2554/803* (2020.02); *B60W 2554/804* (2020.02)

(58) Field of Classification Search
CPC . B60W 2554/4043; B60W 2554/4045; B60W 2554/4046; B60W 2554/801; B60W 2554/802; B60W 2554/803; B60W 2554/804; B60W 30/0956; B60W 2552/53; B60W 2554/4049; B60W 30/165; B60W 40/02; G06V 20/58; G01S 13/931; G01S 17/931
See application file for complete search history.

(56) References Cited

U.S. PATENT DOCUMENTS

| | | | | |
|---|---|---|---|---|
| 9,182,761 | B2 * | 11/2015 | Fujita | G05D 1/0212 |
| 9,412,277 | B2 * | 8/2016 | Nath | B60W 30/09 |
| 10,384,681 | B2 * | 8/2019 | Masui | G08G 1/167 |
| 10,386,849 | B2 * | 8/2019 | Lee | G05D 1/024 |
| 10,457,283 | B2 | 10/2019 | Tamura | |
| 10,647,316 | B2 * | 5/2020 | Lee | G01S 13/726 |
| 10,654,481 | B2 * | 5/2020 | Ide | B60W 30/165 |
| 10,754,347 | B2 * | 8/2020 | Kamata | G06T 7/277 |
| 10,775,497 | B2 * | 9/2020 | Takaki | B60W 10/30 |
| 10,843,692 | B2 | 11/2020 | Tohge et al. | |
| 2004/0104837 | A1 | 6/2004 | Samukawa et al. | |
| 2018/0162392 | A1 | 6/2018 | Takaki | |
| 2019/0113615 | A1 | 4/2019 | Takaki | |
| 2020/0010088 | A1 | 1/2020 | Kokaki | |
| 2022/0319186 | A1 * | 10/2022 | Sasamoto | G08G 1/166 |

FOREIGN PATENT DOCUMENTS

| | | | | |
|---|---|---|---|---|
| CN | 110065492 | A | | 7/2019 |
| CN | 110366513 | A | | 10/2019 |
| CN | 110967024 | A * | 4/2020 | G01C 21/165 |
| EP | 3342669 | A1 | | 7/2018 |
| JP | 2002296350 | A * | 10/2002 | |
| JP | 2017187865 | A | | 10/2017 |
| JP | 2019128700 | A | | 8/2019 |
| KR | 20170049927 | A | | 5/2017 |
| WO | 2018037508 | A1 | | 3/2018 |
| WO | 2018158875 | A1 | | 9/2018 |

OTHER PUBLICATIONS

"Hyttine E, 3D Tracking of Objects in Real Time, May 2017, Tampere University of Technology" (Year: 2017).*

"Lim, T et al., Feature Detection for Pose Estimation, Jan. 2015, AIAA SciTech Forum, AIAA Guidance, Navigation, and Control Conference" (Year: 2015).*

Office Action for Chinese Patent Application No. 202111271236.5 dated Jul. 21, 2023; 16 pp.

Notice of Reasons for Refusal for Patent Application JP 2020-184140 dated Aug. 30, 2022; 8 pp.

* cited by examiner

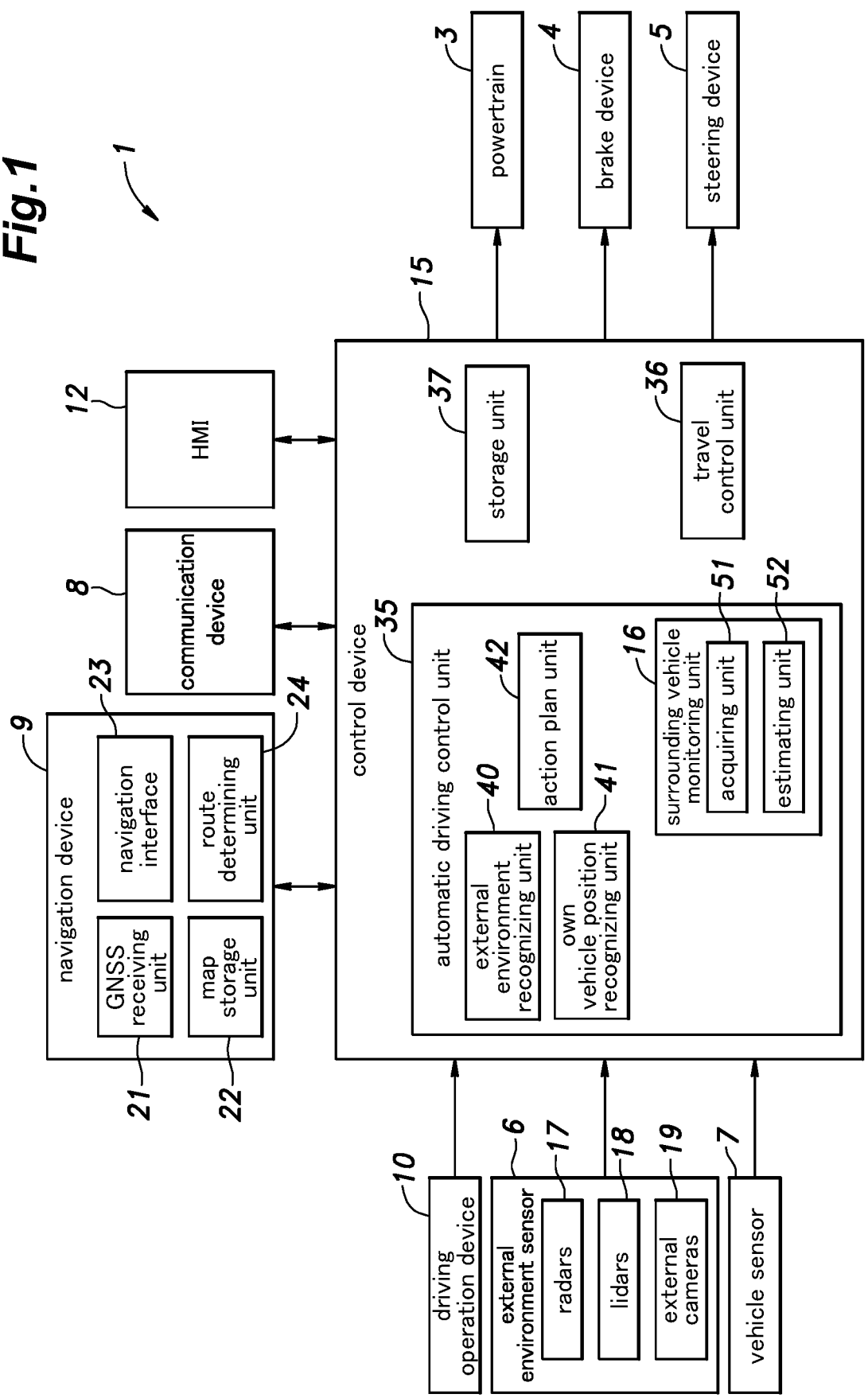

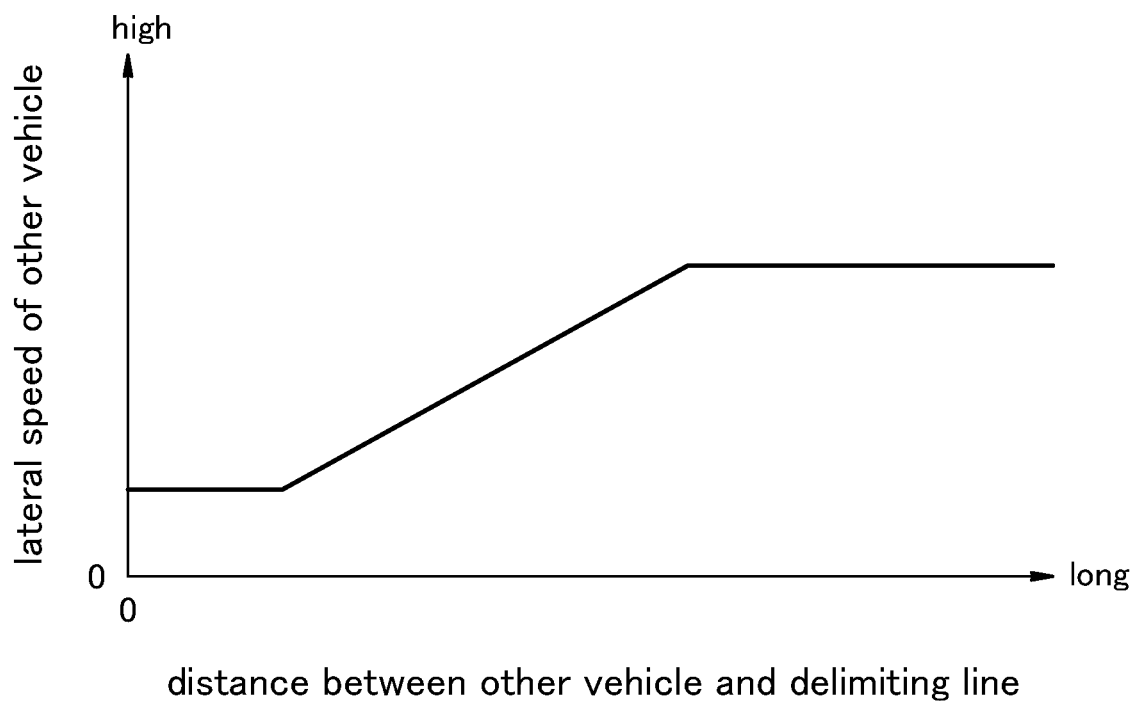

SURROUNDING VEHICLE MONITORING DEVICE AND SURROUNDING VEHICLE MONITORING METHOD

TECHNICAL FIELD

The present invention relates to a surrounding vehicle monitoring device and a surrounding vehicle monitoring method for monitoring another vehicle traveling around an own vehicle.

BACKGROUND ART

There is a conventional technique that uses a sensor such as a radar or a camera to acquire a position, speed, size, or the like of a preceding vehicle traveling in front of an own vehicle. In such a technique, if a following vehicle is present between the own vehicle and the preceding vehicle, the following vehicle occludes (covers) the preceding vehicle, so that information on the preceding vehicle cannot be acquired properly. To solve such a problem, WO2018/037508A1 discloses a monitoring device configured to detect whether the following vehicle occludes the preceding vehicle from a right side or a left side, and to acquire a position, which is shifted by half the width of the preceding vehicle from a non-occluded end thereof, as a position of the preceding vehicle.

However, the monitoring device disclosed in WO2018/037508A1 complicates a procedure for determining an occurrence of occlusion. For example, the monitoring device disclosed in WO2018/037508A1 calculates a first angle between a line segment connecting an end of the preceding vehicle to the own vehicle and the traveling direction of the own vehicle, calculates a second angle between a line segment connecting an end of the following vehicle to the own vehicle and the traveling direction of the own vehicle, and determines that occlusion occurs when a difference between the first angle and the second angle is within a prescribed range.

SUMMARY OF THE INVENTION

In view of the above background, an object of the present invention is to provide a surrounding vehicle monitoring device and a surrounding vehicle monitoring method that can appropriately and easily acquire a position of another vehicle even if occlusion occurs.

To achieve such an object, one aspect of the present invention provides a surrounding vehicle monitoring device (16) configured to monitor at least one other vehicle (61) traveling around an own vehicle (60), the surrounding vehicle monitoring device including: an acquiring unit (51) configured to periodically acquire a position, a speed, and a width of the other vehicle with respect to the own vehicle based on a signal from a sensor (6) configured to detect the other vehicle; and an estimating unit (52) configured to estimate a behavior of the other vehicle based on the position and the speed of the other vehicle, wherein the acquiring unit is configured to acquire a midpoint between a rear left end position and a rear right end position of the other vehicle as the position of the other vehicle, acquire the width of the other vehicle based on the rear left end position and the rear right end position, and change a current position of a great change position to a corrected position and acquire a midpoint between a current position of a small change position and the corrected position as the position of the other vehicle in a case where a first condition that a changing amount of the width in a prescribed period is equal to or more than a prescribed first threshold is satisfied, the corrected position being a position changed from a previous position of the great change position by a correction value that is preset so as to be smaller than a changing amount of the great change position from the previous position to the current position, the great change position being one of the rear left end position and the rear right end position whose changing amount in the prescribed period is the greater of the two, the small change position being another of the rear left end position and the rear right end position whose changing amount in the prescribed period is the smaller of the two.

According to this aspect, in a case where the width of the other vehicle changes due to occlusion, the changing amount of the end position (namely, the great change position) in the prescribed period is reduced. Accordingly, the position of the other vehicle changes slowly in the prescribed period, so that it is possible to avoid determining that the other vehicle is in a specific behavior such as a lane change. In this way, the surrounding vehicle monitoring device according to this aspect can appropriately and easily acquire the position of the other vehicle even if occlusion occurs.

In the above aspect, preferably, in a case where there is the other vehicle traveling more forward than the own vehicle in an adjacent lane adjacent to a reference lane where the own vehicle is traveling and a lateral speed of the other vehicle toward the reference lane is equal to or greater than a prescribed lateral speed threshold, the estimating unit determines that the other vehicle is cutting in the reference lane.

According to this aspect, it is possible to determine a cut-in behavior based on a lateral position and a lateral speed of the other vehicle. In the above aspect of the present invention, the moving speed of the end position decreases according to the changing amount of the width of the other vehicle in the prescribed period. Accordingly, the lateral speed of the other vehicle becomes small even if occlusion occurs, so that it is possible to avoid determining the cut-in behavior.

In the above aspect, preferably, the lateral speed threshold is set to a value that becomes smaller as a distance between the other vehicle and the reference lane becomes shorter.

According to this aspect, it is possible to detect the cut-in behavior faster as the other vehicle is closer to the reference lane.

In the above aspect, preferably, the acquiring unit is configured to change the current position of the great change position to the corrected position when not only the first condition but also a second condition that an absolute value of a lateral speed of the other vehicle with respect to the own vehicle is equal to or less than a prescribed second threshold is satisfied.

According to this aspect, in a case where the other vehicle is moving laterally due to a curve or the like, it is possible to stop the correction of the end position due to occlusion in order to respond quickly to the movement of the other vehicle.

In the above aspect, preferably, the acquiring unit is configured to acquire an inclination angle of the other vehicle with respect to the own vehicle based on the rear left end position and the rear right end position, and change the current position of the great change position to the corrected position when not only the first condition but also a third condition that an absolute value of the inclination angle is equal to or less than a prescribed third threshold is satisfied.

According to this aspect, in a case where the other vehicle is moving laterally due to a curve or the like, it is possible to stop the correction of the end position due to occlusion in order to respond quickly to the movement of the other vehicle.

In the above aspect, preferably, the acquiring unit is configured to acquire a distance between the other vehicle and the own vehicle, and change the current position of the great change position to the corrected position when not only the first condition but also a fourth condition that the distance is equal to or less than a prescribed fourth threshold is satisfied.

According to this aspect, in a case where the other vehicle is relatively far from the own vehicle, it is possible to stop the correction of the end position due to occlusion in order to respond quickly to the movement of the other vehicle.

In the above aspect, preferably, the acquiring unit is configured to acquire a relative speed of the other vehicle with respect to the own vehicle, and change the current position of the great change position to the corrected position when not only the first condition but also a fifth condition that the relative speed is equal to or less than a prescribed fifth threshold is satisfied.

According to this aspect, in a case where the relative speed of the other vehicle is relatively high, it is possible to stop the correction of the end position due to occlusion in order to respond quickly to the movement of the other vehicle.

In the above aspect, preferably, the acquiring unit is configured to change the current position of the great change position to the corrected position when not only the first condition but also a sixth condition that the changing amount of the small change position of the other vehicle is equal to or less than a prescribed sixth threshold.

According to this aspect, in a case where the end position of the other vehicle on a non-occluded side is moving, it is possible to stop the correction of the end position due to occlusion and to reliably detect a lateral movement of the other vehicle in order to respond quickly to the movement of the other vehicle.

Another aspect of the present invention provides a surrounding vehicle monitoring method used by a control device (15) mounted on an own vehicle (60) so as to monitor at least one other vehicle (61) traveling around the own vehicle, the surrounding vehicle monitoring method including: acquiring a midpoint between a rear left end position and a rear right end position of the other vehicle as a position of the other vehicle based on a signal from a sensor (6) configured to detect the other vehicle, and acquiring a width of the other vehicle based on the rear left end position and the rear right end position; changing a current position of a great change position to a corrected position and acquiring a midpoint between a current position of a small change position and the corrected position as the position of the other vehicle in a case where a first condition that a changing amount of the width in a prescribed period is equal to or more than a prescribed first threshold is satisfied, the corrected position being a position changed from a previous position of the great change position by a correction value that is preset so as to be smaller than a changing amount of the great change position from the previous position to the current position, the great change position being one of the rear left end position and the rear right end position whose changing amount in the prescribed period is the greater of the two, the small change position being another of the rear left end position and the rear right end position whose changing amount in the prescribed period is the smaller of the two; and estimating a behavior of the other vehicle based on the position of the other vehicle and a changing amount of the position in the prescribed period.

According to this aspect, in a case where the width of the other vehicle changes due to occlusion, the changing amount of the end position (namely, the great change position) in the prescribed period is reduced. Accordingly, the position of the other vehicle changes slowly in the prescribed period, so that it is possible to avoid determining that the other vehicle is in a specific behavior such as a lane change. In this way, the surrounding vehicle monitoring method according to this aspect can appropriately and easily acquire the position of the other vehicle even if occlusion occurs.

Thus, according to the above aspects, it is possible to provide a surrounding vehicle monitoring device and a surrounding vehicle monitoring method that can appropriately and easily acquire a position and a speed of another vehicle even if occlusion occurs.

BRIEF DESCRIPTION OF THE DRAWING(S)

FIG. 1 is a functional block diagram of a vehicle provided with a vehicle system;

FIG. 5 is a map showing an example of a lateral speed threshold.

DESCRIPTION OF THE PREFERRED EMBODIMENT(S)

Figure 2B:
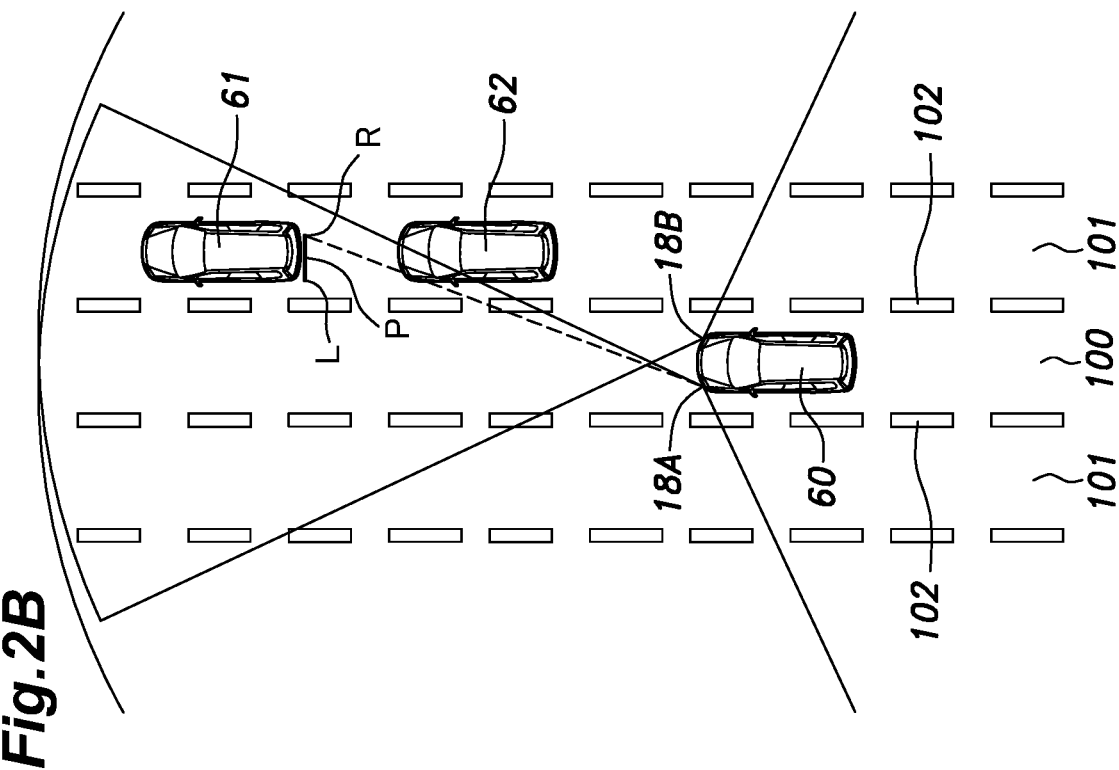
FIG. 2B is an explanatory diagram showing how the sensor detects the other vehicle in a state where occlusion occurs.

In the following, a surrounding vehicle monitoring device and a surrounding vehicle monitoring method according to an embodiment of the present invention will be described with reference to the drawings. As shown in FIG. 1, a vehicle system 1 includes a powertrain 3, a brake device 4, a steering device 5, an external environment sensor 6, a vehicle sensor 7, a communication device 8, a navigation device 9, a driving operation device 10, a Human Machine Interface (HMI) 12, and a control device 15. The surrounding vehicle monitoring device according to the embodiment of the present invention is configured as a surrounding vehicle monitoring unit 16 that is a portion of the control device 15. The surrounding vehicle monitoring method according to the embodiment of the present invention is used by the control device 15.

The powertrain 3 is a device configured to apply a driving force to the vehicle, and includes a power source and a transmission, for example. The power source includes at least one of an internal combustion engine (such as a gasoline engine or a diesel engine) and an electric motor. The brake device 4 is a device configured to apply a brake force to the vehicle, and includes a brake caliper configured to press a brake pad against a brake rotor and an electric cylinder configured to supply an oil pressure to the brake caliper, for example. The brake device 4 may include a parking brake device configured to restrict rotation of wheels via wire cables. The steering device 5 is a device for changing steering angles of the wheels, and includes a rack-and-pinion mechanism configured to steer the wheels and an electric motor configured to drive the rack-andpinion mechanism, for example. The powertrain 3, the brake device 4, and the steering device 5 are controlled by the control device 15.

The external environment sensor 6 is a sensor configured to capture electromagnetic waves and light from the surroundings of the vehicle so as to detect objects outside the vehicle or the like. The external environment sensor 6 includes radars 17, lidars 18 (LIDARS), and external cameras 19, for example. The external environment sensor 6 is configured to output a detection result to the control device 15.

Each radar 17 is configured to emit radio waves such as millimeter waves to the surroundings of the vehicle and capture reflected waves therefrom so as to detect a position (distance and direction) of each object. At least one radar 17 is attached to any portion of the vehicle. Preferably, the radars 17 at least include a front radar configured to emit radio waves toward the front of the vehicle, a rear radar configured to emit radio waves toward the rear of the vehicle, and a pair of left and right side radars configured to emit radio waves toward either side of the vehicle.

Each lidar 18 is configured to emit light such as infrared rays to the surroundings of the vehicle and capture the reflected light therefrom so as to detect the position (distance and direction) of the object. At least one lidar 18 is provided at any position of the vehicle.

Each external camera 19 is configured to image the surroundings of the vehicle including the object (for example, a surrounding vehicle or a pedestrian) present around the vehicle, a guardrail, a curb, a wall, a median, a road shape, and a road marking drawn on a road. Each external camera 19 may consist of a digital camera using a solid imaging element such as a CCD or a CMOS, for example. At least one external camera 19 is provided at any position of the vehicle. The external cameras 19 at least include a front camera configured to image the front of the vehicle, and may further include a rear camera configured to image the rear of the vehicle and a pair of side cameras configured to image either lateral side of the vehicle. Each external camera 19 may consist of a stereo camera, for example.

The vehicle sensor 7 includes a vehicle speed sensor configured to detect a speed of the vehicle, an acceleration sensor configured to detect an acceleration of the vehicle, a yaw rate sensor configured to detect an angular velocity of the vehicle around a vertical axis, a direction sensor configured to detect the direction of the vehicle, and the like. The yaw rate sensor consists of a gyro sensor, for example.

The communication device 8 is configured to mediate communication between inside devices (for example, the control device 15 and the navigation device 9) and outside devices (for example, a surrounding vehicle or a server) arranged outside the vehicle. The control device 15 can wirelessly communicate with the surrounding vehicle via the communication device 8.

The navigation device 9 is a device configured to acquire a current position of the vehicle and provide route guidance to a destination and the like, and includes a GNSS receiving unit 21, a map storage unit 22, a navigation interface 23, and a route determining unit 24. The GNSS receiving unit 21 is configured to identify a position (latitude and longitude) of the vehicle based on a signal received from an artificial satellite (positioning satellite). The map storage unit 22 consists of a known storage device such as a flash memory or a hard disk, and is configured to store map information.

The map information includes road information such as a road type (for example, an expressway, a toll road, a national road, or a prefectural road), the number of lanes on a road, a central position (3D coordinates including longitude, latitude and height) of each lane, shapes of road markings such as delimiting lines and lane boundaries, presence/absence of sidewalks, curbs, fences, or the like, locations of intersections, locations of merging points and branching points of the lanes, locations of emergency parking zones, a width of each lane, road signs, and the like. Further, the map information may include traffic regulation information, address information (an address and a zip code), facility information, telephone number information, and the like. The route determining unit 24 is configured to determine a route to the destination based on the position of the vehicle identified by the GNSS receiving unit 21, the destination inputted to the navigation interface 23, and the map information. Further, when determining the route, the route determining unit 24 may refer to the locations of the merging points and the branching points of the lanes included in the map information so as to determine a target lane, which is a lane where the vehicle should travel.

The driving operation device 10 is configured to accept an input operation a driver performs to control the vehicle. For example, the driving operation device 10 includes a steering wheel, an accelerator pedal, and a brake pedal. Further, the driving operation device 10 may include a shift lever, a parking brake lever, and the like. A sensor for detecting an operation amount is attached to each component of the driving operation device 10. The driving operation device 10 is configured to output a signal indicating the operation amount to the control device 15.

HMI 12 is configured to notify an occupant of various information by a display and a voice and accept an input operation by the occupant.

The control device 15 consists of an electronic control unit (ECU) composed of a CPU, a ROM, a RAM, and the like. The CPU executes operation processing according to a program so that the control device 15 executes various vehicle control. The control device 15 may consist of one piece of hardware, or may consist of a unit including plural pieces of hardware. Further, the functions of the control device 15 may be at least partially executed by hardware such as an LSI, an ASIC, and an FPGA, or may be executed by a combination of software and hardware.

The control device 15 is configured to combine various vehicle control so as to perform automatic driving control at each of plural levels. For example, in the automatic driving control at level 0, the control device 15 does not perform vehicle control, and the driver performs all driving operations. In the automatic driving control at level 1, the control device 15 performs Adaptive Cruise Control (ACC) and Lane Keeping Assistance (LKA). In the automatic driving control at levels 2 and 3, the driver monitors the surroundings of the vehicle, and the control device 15 performs all driving operations. The degree to which the driver monitors the surroundings of the vehicle differs between Levels 2 and 3.

As shown in FIG. 1, the control device 15 includes an automatic driving control unit 35, a travel control unit 36, and a storage unit 37. The automatic driving control unit 35 includes an external environment recognizing unit 40, an own vehicle position recognizing unit 41, and an action plan unit 42. The external environment recognizing unit 40 is configured to recognize obstacles around the vehicle, the shape of the road, presence/absence of sidewalks, and road markings based on the detection result of the external environment sensor 6. For example, the obstacles may be a guardrail, a utility pole, a surrounding vehicle, and a person such as a pedestrian.

The surrounding vehicle monitoring unit 16 is included in the external environment recognizing unit 40. The surrounding vehicle monitoring unit 16 is configured to acquire states (for example, a position, a speed, and an acceleration) of the surrounding vehicle based on a signal from the external environment sensor 6.

The own vehicle position recognizing unit 41 is configured to recognize a traveling lane, which is a lane where the vehicle is traveling, and a relative position and an angle of the vehicle with respect to the traveling lane. For example, the own vehicle position recognizing unit 41 may recognize the traveling lane based on the map information stored in the map storage unit 22 and the position of the vehicle acquired by the GNSS receiving unit 21. Further, the own vehicle position recognizing unit 41 is configured to extract from the map information the delimiting lines around the vehicle drawn on a road surface and compare the shapes of the delimiting lines around the vehicle with the shapes of the delimiting lines imaged by the external cameras 19 so as to recognize the relative position and the angle of the vehicle with respect to the traveling lane.

The action plan unit 42 is configured to sequentially create an action plan for causing the vehicle to travel along the route. More specifically, the action plan unit 42 first determines events in which the vehicle travels in the target lane determined by the route determining unit 24 without coming in contact with the obstacles. Then, the action plan unit 42 generates a target trajectory where the vehicle should travel in the future based on the determined events. The target trajectory consists of trajectory points (points the vehicle should reach at respective times) that are aligned in order. The action plan unit 42 may generate the target trajectory based on a target speed and a target acceleration set for each event. At this time, information on the target speed and the target acceleration is expressed by intervals between the trajectory points.

The travel control unit 36 is configured to control the powertrain 3, the brake device 4, and the steering device 5 such that the vehicle passes on time along the target trajectory generated by the action plan unit 42.

The storage unit 37 consists of ROM, RAM, and the like, and is configured to store information required for the processing executed by the automatic driving control unit 35 and the travel control unit 36.

In the following, the surrounding vehicle monitoring unit 16 will be described. The surrounding vehicle monitoring unit 16 is configured to monitor at least one other vehicle traveling around an own vehicle. The surrounding vehicle monitoring unit 16 includes an acquiring unit 51 and an estimating unit 52. The acquiring unit 51 is configured to periodically acquire a position, a speed, and a width of the other vehicle with respect to the own vehicle based on the signal from the external environment sensor 6 configured to detect the other vehicle. The estimating unit 52 is configured to estimate a behavior of the other vehicle based on the position and the speed of the other vehicle acquired by the acquiring unit 51.

Figure 2A:
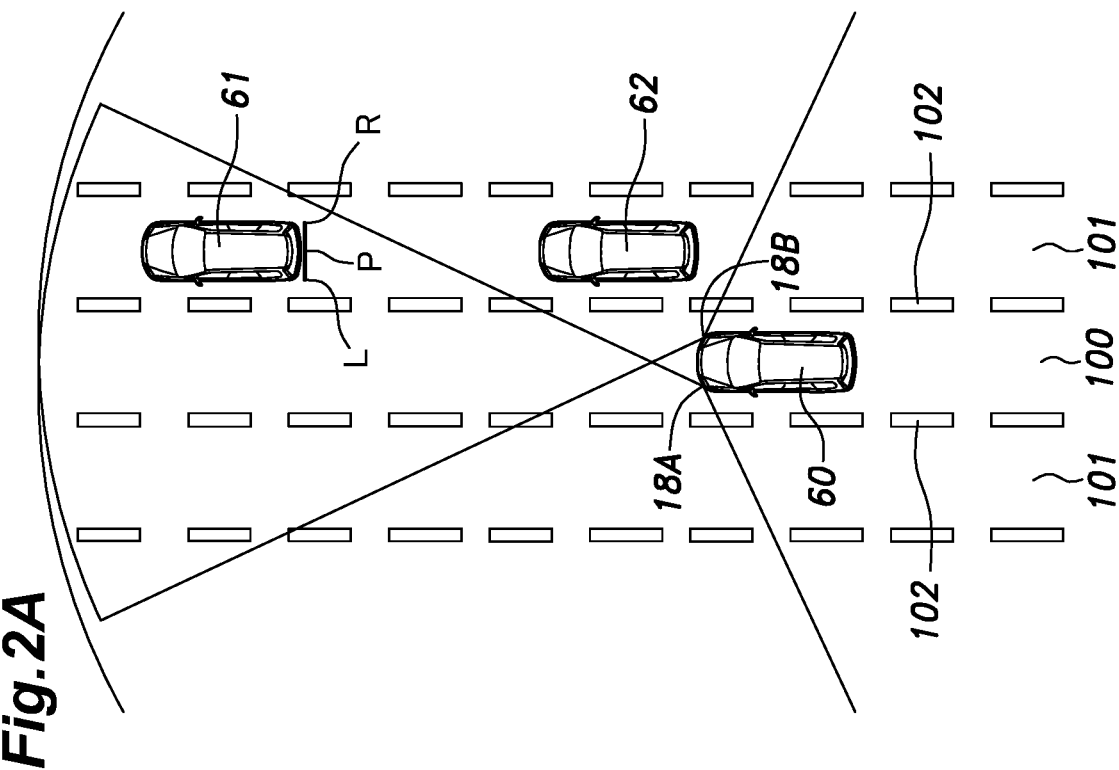
FIG. 2A is an explanatory diagram showing how a sensor detects another vehicle in a state where occlusion does not occur.

The acquiring unit 51 is configured to acquire information on the other vehicle based on signals from at least one of the radars 17, the lidars 18, and the external cameras 19 included in the external environment sensor 6. In the following, an example in which the acquiring unit 51 acquires the information on the other vehicle from the lidars 18 will be described. In the present embodiment, as shown in FIGS. 2A and 2B, the lidars 18 include a left lidar 18A provided at a front left end of the own vehicle 60 and a right lidar 18B provided at a front right end of the own vehicle 60. The left lidar 18A and the right lidar 18B each have a horizontal viewing angle of about 120 degrees and a vertical viewing angle of about 25 degrees. The left lidar 18A has a field of view ranging from the front to the left of the own vehicle 60, and the right lidar 18B has a field of view ranging from the front to the right of the own vehicle 60. The field of view of the left lidar 18A and the field of view of the right lidar 18B overlap with each other in front of the own vehicle 60.

The acquiring unit 51 is configured to periodically acquire the positions and the speeds of the other vehicles 61 and 62 (the other vehicles present around the own vehicle 60) with respect to the own vehicle 60 based on the signals from the lidars 18. The acquiring unit 51 is configured to acquire a rear left end position L and a rear right end position R of the other vehicle 61 based on the signals from the lidars 18, and acquire a midpoint of a line segment connecting the rear left end position L and the rear right end position R as a position P of the other vehicle 61 with respect to the own vehicle 60. Incidentally, the rear left end position L and the rear right end position R are relative positions with respect to the own vehicle 60. The acquiring unit 51 is configured to acquire the speed of the other vehicle 61 with respect to the own vehicle 60 based on a difference between a previous position P(n−1) of the other vehicle 61 and a current position P(n) of the other vehicle 61. Further, the acquiring unit 51 is configured to acquire the width W of the other vehicle 61 based on a difference between the rear left end position L and the rear right end position R.

FIGS. 2A and 2B each show a state where a preceding other vehicle 61 and a following other vehicle 62, which follows the preceding other vehicle 61, are present in an adjacent lane 101 adjacent to a reference lane 100 where the own vehicle 60 is traveling. Both the preceding other vehicle 61 and the following other vehicle 62 are traveling more forward than the own vehicle 60. As shown in FIG. 2A, in a case where the following other vehicle 62 is far from the preceding other vehicle 61, the lidars 18 (left lidar 18A and right lidar 18B) can appropriately detect the rear left end position L, the rear right end position R, the position P, and the width W of the preceding other vehicle 61 with respect to the own vehicle 60.

However, as shown in FIG. 2B, when the following other vehicle 62 approaches the preceding other vehicle 61, laser beams emitted from the lidars 18 are blocked by the following other vehicle 62, and cannot reach at least a portion of the preceding other vehicle 61. Namely, the following other vehicle 62 occludes (covers) the preceding other vehicle 61. In FIG. 2B, the following other vehicle 62 occludes a right portion of the preceding other vehicle 61, so that the laser beams emitted from the lidars 18 cannot reach the right portion of the preceding other vehicle 61. Accordingly, the acquiring unit 51 acquires a reachable rightmost position (namely, a rightmost position among positions the laser beams from the lidars 18 can reach) of the preceding other vehicle 61 as the rear right end position R of the preceding other vehicle 61. In this case, the rear right end position R of the preceding other vehicle 61 acquired by the acquiring unit 51 is arranged on the left of an actual rear right end position of the preceding other vehicle 61. As a result, the position P of the preceding other vehicle 61, which is acquired based on the rear left end position L and the rear right end position R of the preceding other vehicle 61, is displaced to the left from the actual position of the preceding other vehicle 61. Further, the width W of the other vehicle 61, which is acquired based on the rear left end position L and the rear right end position R of the other vehicle 61, becomes narrower than an actual width of the other vehicle 61. Further, if a range of occlusion is extended as the following other vehicle 62 approaches the preceding other vehicle 61, the rear right end position R of the other vehicle 61 acquired by the acquiring unit 51 moves leftward hour by hour. Accordingly, the position P of the other vehicle 61 acquired by the acquiring unit 51 moves leftward even if the other vehicle 61 does not move leftward. As a result, the acquiring unit 51 detects a leftward speed of the other vehicle 61. In this way, when occlusion occurs, errors occur in the position, the speed, and the width of the other vehicle 61 acquired by the acquiring unit 51.

Figure 3:
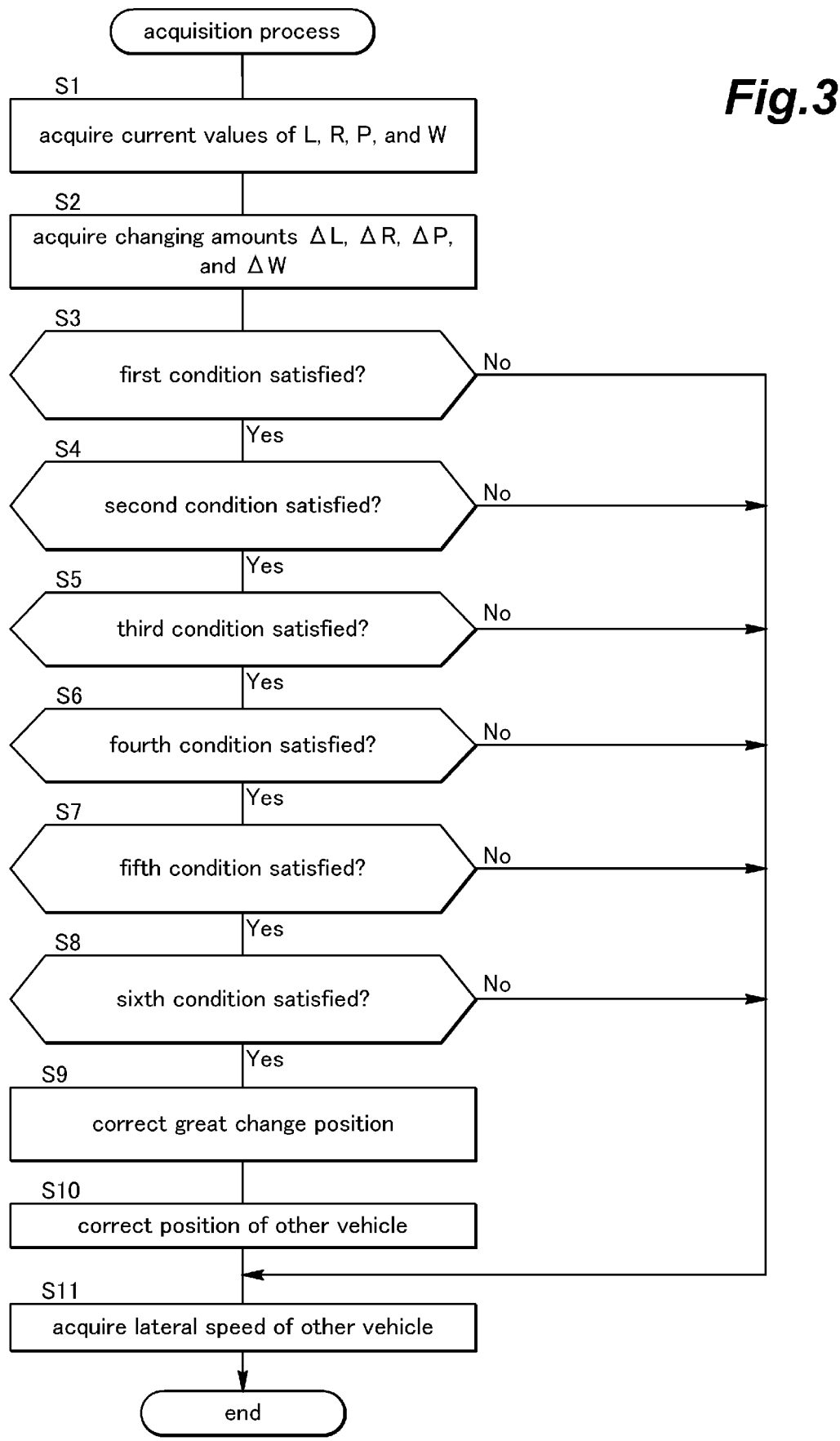
FIG. 3 is a flowchart of an acquisition process.

The acquiring unit 51 according to the present embodiment periodically executes an acquisition process shown in FIG. 3, and acquires the position and the speed of the other vehicle 61 in order to suppress the errors that occur in the position and the like of the other vehicle 61 due to the above-mentioned occlusion. First, the acquiring unit 51 acquires current values of the rear left end position L, the rear right end position R, the position P, and the width W of the other vehicle 61 based on the signals from the lidars 18 (S1). The position P and the width W are acquired based on the rear left end position L and the rear right end position R. The position P is a position of the midpoint of the line segment connecting the rear left end position L and the rear right end position R. The width W is a distance between the rear left end position L and the rear right end position R.

Next, the acquiring unit 51 acquires a changing amount ΔL of the rear left end position L based on a current value L(n) and a previous value L(n−1) (a value acquired in the last acquisition process) of the rear left end position L, acquires a changing amount ΔR of the rear right end position R based on a current value R(n) and a previous value R(n−1) (a value acquired in the last acquisition process) of the rear right end position R, acquires a changing amount ΔP of the position P based on a current value P(n) and a previous value P(n−1) (a value acquired in the last acquisition process) of the position P, and acquires a changing amount ΔW of the width W based on a current value W(n) and a previous value W(n−1) (a value acquired in the last acquisition process) of the width W (S2). Since the changing amount ΔL of the rear left end position L, the changing amount ΔR of the rear right end position R, the changing amount ΔP of the position P, and the changing amount ΔW of the width W are changing amounts in a short period, so that they can be called "changing speeds". In another embodiment, the acquiring unit 51 may calculate each of these changing amounts based on the current value and the previous value acquired in the past acquisition process several times earlier than the last acquisition process.

Next, the acquiring unit 51 determines whether a first condition that an absolute value of the changing amount ΔW of the width W is equal to or greater than a prescribed first threshold is satisfied (S3). The first condition is set for determining whether the other vehicle 61 is occluded and the changing amount in the occluded range is relatively large.

In a case where the first condition is satisfied (a determination result of S3 is Yes), the acquiring unit 51 determines whether a second condition that an absolute value of a lateral speed of the other vehicle 61 with respect to the own vehicle 60 is equal to or less than a prescribed second threshold is satisfied (S4). The lateral speed may be set based on the changing amount ΔP of the position P of the other vehicle 61. In another embodiment, the lateral speed of the other vehicle 61 with respect to the own vehicle 60 may be acquired based on the smaller of the changing amount ΔL of the rear left end position L and the changing amount ΔR of the rear right end position R. The second condition is set for determining whether the other vehicle 61 has entered a curve.

In a case where the second condition is satisfied (a determination result of S4 is Yes), the acquiring unit 51 acquires an inclination angle θ of the other vehicle 61 with respect to the own vehicle 60 based on the rear left end position L and the rear right end position R of the other vehicle 61, and determines whether a third condition that an absolute value of the inclination angle θ is equal to or less than a prescribed third threshold is satisfied (S5). The acquiring unit 51 may acquire the inclination angle θ of the other vehicle 61 with respect to the own vehicle 60 by calculating an angle in a horizontal plane between the front-and-rear direction and a line segment perpendicular to a line segment connecting the rear left end position L and the rear right end position R. The third condition is set for determining whether the other vehicle 61 inclines with respect to the own vehicle 60.

In a case where the third condition is satisfied (a determination result of S5 is Yes), the acquiring unit 51 acquires a distance D between the other vehicle 61 and the own vehicle 60, and determines whether a fourth condition that the distance D is equal to or less than a prescribed fourth threshold D4 is satisfied (S6). The fourth condition is set for determining whether the other vehicle 61 is present within a prescribed distance from the own vehicle 60.

In a case where the fourth condition is satisfied (a determination result of S6 is Yes), the acquiring unit 51 acquires a relative speed of the other vehicle 61 with respect to the own vehicle 60, and determines whether a fifth condition that an absolute value of the relative speed is equal to or less than a prescribed fifth threshold is satisfied (S7). The fifth condition is set for determining whether the relative speed of the other vehicle 61 with respect to the own vehicle 60 is equal to or less than a prescribed value (namely, whether the relative speed thereof is relatively small).

In a case where the fifth condition is satisfied (a determination result of S7 is Yes), the acquiring unit 51 acquires a great change position and a small change position of the other vehicle 61, and determines whether a sixth condition that a changing amount of the small change position of the other vehicle 61 is equal to or less than a prescribed sixth threshold is satisfied (S8). The great change position is one of the rear left end position L and the rear right end position R of the other vehicle 61 whose changing amount in a prescribed period is the greater of the two. The small change position is the other of the rear left end position L and the rear right end position R of the other vehicle 61 whose changing amount in the prescribed period is the smaller of the two. The acquiring unit 51 determines whether the smaller of the changing amount ΔL of the rear left end position L and the changing amount ΔR of the rear right end position R acquired in step S2 is equal to or less than the sixth threshold. The sixth condition is set for determining whether the other vehicle 61 is moving laterally based on the changing amount of a non-occluded end of the other vehicle 61.

In a case where the sixth condition is satisfied (a determination result of S8 is Yes), the acquiring unit 51 changes a current value of the great change position to a corrected position (S9). As described above, the great change position is one of the rear left end position L and the rear right end position R whose changing amount in the prescribed period is the greater of the two. The corrected position is a position changed by a preset correction value H from a previous position of the great change position. The correction value H is preset so as to be smaller than the changing amount ΔR of the rear right end position R from the previous value R(n−1) to the current value R(n) (namely, the changing amount of the great change position from the previous position to the current position). As shown in FIG. 2B, in a case where the right portion of the other vehicle 61 which is not moving laterally is occluded, a corrected position calculated by adding the correction value H to the previous value R(n−1) of the rear right end position R, instead of the current value R(n) of the rear right end position R acquired by the lidars 18, is set as the current value R(n) of the rear right end position R of the other vehicle 61. This corrected current value R(n) of the rear right end position R is arranged between the previous value R(n−1) of the rear right end position R and the uncorrected current value R(n) of the rear right end position R. Accordingly, even if occlusion occurs, the changing amount ΔR of the rear right end position R(n) is regulated to the correction value H, and the movement of the rear right end position R(n) becomes slow.

Upon correcting the current value of the rear left end position L or the rear right end position R, the acquiring unit 51 stores the corrected value as the current value. Then, the acquiring unit 51 uses the corrected value as the previous value when acquiring the next current value.

After step S9, the acquiring unit 51 acquires the corrected position P of the other vehicle 61 based on one of the rear left end position L and the rear right end position R which has been corrected in step S8 and the other of the rear left end position L and the rear right end position R which has not been corrected (S10).

In step S11, the acquiring unit 51 acquires a lateral speed of the other vehicle 61 based on the current position P(n) and the previous position P(n−1) of the other vehicle 61. In a case where step S11 is performed after steps S8 and S9, the current position P(n) is set to a corrected value.

When an error occurs in the position of the other vehicle 61 due to occlusion, the degree of the error is lowered by the above-mentioned acquisition process. In the acquisition process, the determinations (S4 to S8) based on the second to sixth conditions can be selected, and all or some of them may be omitted.

Figure 4:
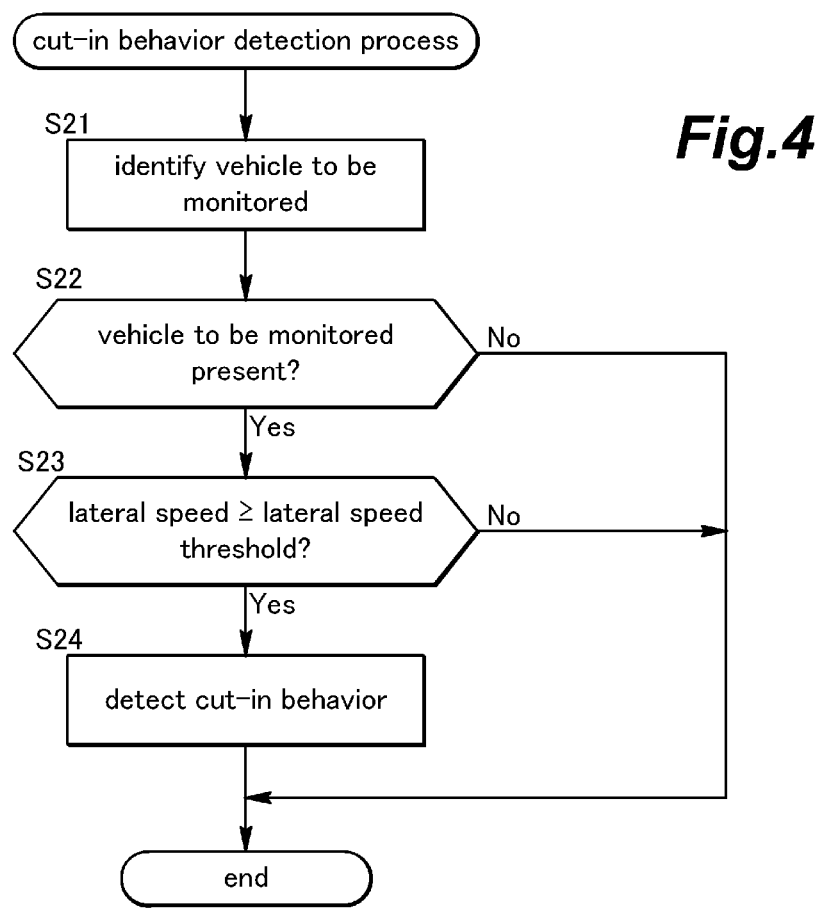
FIG. 4 is a flowchart of a cut-in behavior detection process.

The estimating unit 52 estimates a behavior (for example, a cut-in behavior, a lane change, a merging behavior, or the like) of each other vehicle 61, 62 based on the positions and speeds of the other vehicle acquired by the acquiring unit 51. In the following, a cut-in behavior detection process as an example of the process executed by the estimating unit 52 will be described with reference to FIG. 4. The cut-in behavior detection process is executed based on the flowchart shown in FIG. 4. First, the estimating unit 52 identifies a vehicle to be monitored, namely, a vehicle whose cut-in behavior is to be monitored (S21). The estimating unit 52 identifies the other vehicle that is present within a prescribed range from the own vehicle 60 based on the position of the other vehicle acquired by the acquiring unit 51. Preferably, the prescribed range is set in the adjacent lane 101 adjacent to the reference lane 100 where the own vehicle 60 is traveling, and ranges from the own vehicle 60 to the other vehicle traveling in front of the own vehicle 60 in the reference lane 100. Further, in a case where the other vehicle traveling in front of the own vehicle 60 in the reference lane 100 is present at a distance equal to or more than a prescribed threshold (for example, 100 m), the prescribed range is set in the adjacent lane 101 adjacent to the reference lane 100 where the own vehicle 60 is traveling, and ranges from the own vehicle 60 to the front thereof within the prescribed threshold. The estimating unit 52 determines whether the vehicle to be monitored is present (S22), and ends the cut-in behavior detection process in a case where the vehicle to be monitored is not present (a determination result of S22 is No).

In a case where the vehicle to be monitored is present (a determination result of S22 is Yes), the estimating unit 52 determines whether the lateral speed of the other vehicle identified in step S21 toward the reference lane 100 is equal to or greater than a prescribed lateral speed threshold (S23). The estimating unit 52 acquires the lateral speed of the other vehicle acquired by the acquiring unit 51. The lateral speed may be a lateral movement amount in the prescribed period. In another embodiment, the estimating unit 52 may acquire the lateral movement amount of the other vehicle in the prescribed period based on the position of the other vehicle acquired by the acquiring unit 51 at each point in time. The lateral speed threshold is set to a value that becomes smaller as a distance between the other vehicle and the reference lane becomes shorter. The estimating unit 52 has a map of the lateral speed threshold which is set according to a distance between the position of the other vehicle and a delimiting line 102 that separates the adjacent lane 101 from the reference lane 100. The map of the lateral speed threshold may define a relationship as shown in FIG. 5, for example. In the map of the lateral speed threshold, the lateral speed threshold is set to a value that becomes smaller as the distance between the position of the other vehicle and the delimiting line 102 becomes shorter. Accordingly, the estimating unit 52 detects the cut-in behavior of the other vehicle at a lower lateral speed, as the other vehicle gets closer to the delimiting line 102.

In a case where the lateral speed of the other vehicle toward the reference lane 100 is equal to or more than the lateral speed threshold (a determination result of S23 is Yes), the estimating unit 52 determines that the identified other vehicle is cutting in the reference lane 100. Namely, the estimating unit 52 detects the cut-in behavior of the identified other vehicle (S24). In a case where either the determination result of step S22 or S23 is No, the estimating unit 52 does not detect the cut-in behavior of the other vehicle.

In a case where the estimating unit 52 detects the cut-in behavior, the action plan unit 42 sets the other vehicle that is cutting in the reference lane 100 as the preceding vehicle to be followed. The travel control unit 36 may control the brake device 4 and the powertrain 3 so as to maintain the distance between the own vehicle and the preceding vehicle at a prescribed value.

In the surrounding vehicle monitoring unit 16 according to the present embodiment, the changing speed of the end position becomes slow in a case where the width of the other vehicle changes due to occlusion. Accordingly, the changing speed of the position of the other vehicle becomes slow, and it is possible to avoid determining that the other vehicle is cutting in the reference lane. In this way, the surrounding vehicle monitoring unit 16 (the surrounding vehicle monitoring device) can appropriately and easily acquire the position of the other vehicle even if occlusion occurs.

Concrete embodiments of the present invention have been described in the foregoing, but the present invention should not be limited by the foregoing embodiments and various modifications and alterations are possible within the scope of the present invention.

The invention claimed is:

1. A vehicle including a surrounding vehicle monitoring device configured to monitor at least one other vehicle traveling around an own vehicle, the vehicle comprising:
   a powertrain;
   a brake device;
   a steering device;
   an external environment sensor; and
   a control device having an electronic control unit composed of a CPU, a ROM, and a RAM,
   wherein the surrounding vehicle monitoring device is configured by the control device and comprises:
   an acquiring unit configured to periodically acquire a position, a speed, and a width of the other vehicle with respect to the own vehicle based on a signal from a sensor configured to detect the other vehicle; and
   an estimating unit configured to estimate a behavior of the other vehicle based on the position and the speed of the other vehicle,
   an action plan unit configured to generate a target trajectory where the vehicle should travel in the future, and
   a travel control unit configured to control the powertrain, the brake device, and the steering device such that the vehicle passes on time along the target trajectory generated by the action plan unit,
   wherein the acquiring unit is configured to
   acquire a midpoint between a rear left end position and a rear right end position of the other vehicle as the position of the other vehicle,
   acquire the width of the other vehicle based on the rear left end position and the rear right end position,
   acquire an inclination angle of the other vehicle with respect to the own vehicle based on the rear left end position and the rear right end position,
   change a current position of a great change position to a corrected position and acquire a midpoint between a current position of a small change position and the corrected position as the position of the other vehicle in a case where a first condition that a changing amount of the width in a prescribed period is equal to or more than a prescribed first threshold and a second condition that an absolute value of a lateral speed of the other vehicle with respect to the own vehicle is equal to or less than a prescribed second threshold, and a third condition that an absolute value of the inclination angle is equal to or less than a prescribed third threshold are satisfied, the corrected position being a position changed from a previous position of the great change position by a correction value that is preset so as to be smaller than a changing amount of the great change position from the previous position to the current position, the great change position being one of the rear left end position and the rear right end position whose changing amount in the prescribed period is the greater of the two, the small change position being another of the rear left end position and the rear right end position whose changing amount in the prescribed period is the smaller of the two,
   not change the current position of the great change position in a case where either the first condition, the second condition, or the third condition is not satisfied,
   in a case where there is the other vehicle traveling more forward than the own vehicle in an adjacent lane adjacent to a reference lane where the own vehicle is traveling and a lateral speed of the other vehicle toward the reference lane is equal to or greater than a prescribed lateral speed threshold, the estimating unit determines that the other vehicle is cutting in the reference lane,
   in a case where the estimating unit determines that the other vehicle is cutting in the reference lane, the action plan unit sets the other vehicle that is cutting in the reference lane as a preceding vehicle to be followed, and
   the travel control unit controls the brake device and the powertrain so as to maintain the distance between the own vehicle and the preceding vehicle at a prescribed value.

2. The vehicle according to claim 1, wherein the lateral speed threshold is set to a value that becomes smaller as a distance between the other vehicle and the reference lane becomes shorter.

3. The vehicle according to claim 1, wherein the acquiring unit is configured to acquire a distance between the other vehicle and the own vehicle, and change the current position of the great change position to the corrected position when the first condition, the second condition, the third condition, and a fourth condition that the distance is equal to or less than a prescribed fourth threshold are all satisfied, and not change the current position of the great change position in a case where either the first condition, the second condition, the third condition, or the fourth condition is not satisfied.

4. The vehicle according to claim 1, wherein the acquiring unit is configured to acquire a relative speed of the other vehicle with respect to the own vehicle, and change the current position of the great change position to the corrected position when the first condition, the second condition, the third condition, and a fifth condition that the relative speed is equal to or less than a prescribed fifth threshold are all satisfied, and not change the current position of the great change position in a case where either the first condition, the second condition, the third condition, or the fifth condition is not satisfied.

5. The vehicle according to claim 1, wherein the acquiring unit is configured to change the current position of the great change position to the corrected position when the first condition, the second condition, the third condition, and a sixth condition that the changing amount of the small change position of the other vehicle is equal to or less than a prescribed sixth threshold are all satisfied, and not change the current position of the great change position in a case where either the first condition, the second condition, the third condition, or the sixth condition is not satisfied.

* * * * *